(12) United States Patent
Shimizu

(10) Patent No.: US 7,759,584 B2
(45) Date of Patent: Jul. 20, 2010

(54) ELECTRONIC PART EQUIPPED UNIT

(75) Inventor: Tomohiko Shimizu, Makinohara (JP)

(73) Assignee: Yazaki Corporation, Tokyo (JP)

( * ) Notice: Subject to any disclaimer, the term of this patent is extended or adjusted under 35 U.S.C. 154(b) by 188 days.

(21) Appl. No.: 12/167,926

(22) Filed: Jul. 3, 2008

(65) Prior Publication Data

US 2009/0009981 A1   Jan. 8, 2009

(30) Foreign Application Priority Data

Jul. 5, 2007   (JP)   ............... 2007-176841

(51) Int. Cl.
  *H05K 7/02*   (2006.01)
(52) U.S. Cl. .......... 174/541; 174/59; 174/563; 439/76.2
(58) Field of Classification Search .......... 174/549, 174/520, 563, 59, 541; 439/76.2
See application file for complete search history.

(56) References Cited

U.S. PATENT DOCUMENTS

| | | | | |
|---|---|---|---|---|
| 3,610,810 | A * | 10/1971 | Fribley, Jr. | 174/59 |
| 4,555,638 | A * | 11/1985 | Lobe | 307/10.1 |
| 6,022,247 | A * | 2/2000 | Akiyama et al. | 439/701 |
| 6,383,012 | B1 * | 5/2002 | Kisu et al. | 439/404 |
| 6,545,861 | B1 * | 4/2003 | Hayes et al. | 361/642 |
| 6,648,672 | B1 * | 11/2003 | Meinke | 439/422 |
| 6,800,807 | B2 * | 10/2004 | Ishiguro et al. | 174/50 |
| 7,078,620 | B2 * | 7/2006 | Ikeda et al. | 174/50 |
| 7,189,921 | B2 * | 3/2007 | Andresen et al. | 174/50 |
| 7,494,348 | B1 * | 2/2009 | Tyler et al. | 439/79 |
| 7,558,079 | B2 * | 7/2009 | Janisch | 361/822 |

FOREIGN PATENT DOCUMENTS

JP   2006-109587 A   4/2006

* cited by examiner

*Primary Examiner*—Hung V Ngo
(74) *Attorney, Agent, or Firm*—Sughrue Mion, PLLC

(57) ABSTRACT

An electronic part equipped unit includes a case body that includes a first recess portion for containing an electronic part and a second recess portion for containing a relay terminal which is connected to the electronic part, a wire side terminal to which a middle portion of a wire is attached, and a cover member to which the wire side terminal is attached. The wire side terminal is brought into contact with the relay terminal when the cover member to which the wire side terminal is attached is fitted to the second recess portion of the case body. A positioning rib for restricting the relay terminal is provided on a bottom portion of the second recess portion of the cover body. The wire side terminal has a rib contact portion. A projection amount of the positioning rib is set so that the rib contact portion is brought into contact with the positioning rib when the cover member is fitted to the second recess portion of the case body in a state that the wire side terminal is not completely attached to the cover member.

4 Claims, 8 Drawing Sheets

ELECTRONIC PART EQUIPPED UNIT

BACKGROUND

The present invention relates to an electronic part equipped unit including an electronic part at inside of a case body and attached to a middle portion of a wire.

For example, in various sensors mounted to an automobile or the like, noise from a noise source having a high frequency component, such as a horn or a wire, and external noise from a neon sign or the like, an induction noise or the like are conducted to the sensors through a wire, and there is a concern of bringing about an erroneous operation thereby. In order to remove the noise, development of an electronic part equipped unit (noise prevention piece) has been promoted.

In FIG. 9, a reference 1 designates a wire. Further, a reference 2 designates an electronic part equipped unit connected to a middle portion 3 of the wire 1. The electronic part equipped unit 2 includes a case body 4 having an electronic part containing recess portion and a fitting connection recess portion, a containing recess portion cover 6 consecutively aligned to the case body 4 by way of a hinge 5 for covering the electronic part containing recess portion, a resin locking portion 7 formed at the containing recess portion cover 6 and locked to an attaching counter party, an electronic part 9 which is contained in the electronic part containing recess portion and in which a pair of leads 8a and 8b are extended to the fitting connection recess portion, a relay terminal 10 brought into contact with the lead 8a on one side, a ground terminal 12 made of a metal which is brought into contact with the lead 8b on other side and in which a portion projected from the fitting connection recess portion is formed as a ground portion 11, and a cover attached wire 15 which includes a wire side terminal 13 and a cover member 14 and attached to the middle portion of the wire 1 and in which the wire side terminal 13 is brought into contact with the relay terminal 10 and the cover member 14 is fitted to the fitting connection recess portion.

In the electronic part equipped unit 2, the fitting connection recess portion and the cover member 14 fitted thereto are disposed between the resin locking portion 7 and the ground portion 11. The cover member 14 and the fitting connection recess portion are fitted to each other with a cover side fitting portion 16 and a projected locking portion 17.

When the electronic part equipped unit 2 is attached to a vehicle, first, the resin looking portion 7 is inserted to a seat face made of a metal of an attaching counter party to be provisionally fixed, next, the ground portion 11 of the ground terminal 12 is fastened by a screw to connect to thereby finish fixing a total thereof.

Further, as a technology with regard to the electronic part equipped unit 2, for example, a disclosed technology of Patent Reference 1 is described below.

[Patent Reference 1] JP-A-2006-109587

Meanwhile, according to the electronic part equipped unit 2, with regard to the cover attached wire 15, the following problem is posed. That is, the cover attached wire 15 is assembled by inserting the wire side terminal 13 into an inner portion of the cover member 14 while pushing a bottom portion (lower side) of the wire side terminal 13 by a finger of an operator. Therefore, a plurality of tab-like portions directed to an upper side of the wire side terminal 13 is liable to be caught by a lower side opening edge portion of the cover member 14. It cause a problem that the operator carries out such insertion operation again if the tab-like portions are caught by the lower side opening edge portion. That is, the electronic part equipped unit 2 has a structure of effecting a bad influence on an operability.

Further, according to the cover attached wire 15, after inserting the wire side terminal 13 to the cover member 14, it is difficult to structurally know whether the wire side terminal 13 and the cover member 14 are locked to each other completely since such situation is concealed by the bottom of the wire side terminal 13, which poses a problem.

Also, if the wire side terminal 13 is rattled considerably at the inner portion of the cover member 14, the cover attached wire 15 can not maintain a connecting state to the relay terminal 10. Further, in fitting the cover attached wire 15 to the fitting connection recess portion of the case body 4, when the considerably rattled wire side terminal 13 is butted to the relay terminal 10, there also poses a problem that the operability is influenced thereby.

With regard to the connecting state, the connecting state cannot be maintained excellently even when the relay terminal 10 attached to the fitting connection recess portion of the case body 4 is rattled, and therefore, also the similar problem is posed thereby.

SUMMARY

The invention has been carried out in view of the above described situation and it is a problem thereof to provide an electronic part equipped unit capable of promoting an operability and excellently maintaining a connecting state.

In order to achieve the above object, according to the present invention, there is provided an electronic part equipped unit, comprising:

a case body that includes a first recess portion for containing an electronic part and a second recess portion for containing a relay terminal which is connected to the electronic part;

a wire side terminal to which a middle portion of a wire is attached; and a cover member to which the wire side terminal is attached, wherein the wire side terminal is brought into contact with the relay terminal when the cover member to which the wire side terminal is attached is fitted to the second recess portion of the case body;

wherein a positioning rib for restricting the relay terminal is provided on a bottom portion of the second recess portion of the cover body;

wherein the wire side terminal has a rib contact portion; and wherein a projection amount of the positioning rib is set so that the rib contact portion is brought into contact with the positioning rib when the cover member is fitted to the second recess portion of the case body in a state that the wire side terminal is not completely attached to the cover member.

According to the above configuration, since the positioning rib is provided on the fitting connection recess portion, rattling of the relay terminal can be prevented. Further, even when the wire side terminal is not completely attached to the cover member (a semilocking state), the wire side terminal is pushed to an inner portion of the cover member by the positioning rib to be brought into a locking state, and therefore, semilocking of the wire side terminal can be prevented.

Also, an advantage of capable of preventing rattling of the relay terminal at the fitting connection recess portion is achieved. Thereby, an effect of capable of excellently maintaining a state of connecting the wire side terminal and the relay terminal is achieved. Further, according to the invention, an advantage of capable of preventing the wire side terminal from being semilocked to the cover member is achieved.

Preferably, the wire side terminal includes a bottom portion, and a terminal contact portion for contacting to the relay terminal and a locking portion for retaining to the cover member. The terminal contact portion and the looking portion are provided on the bottom portion. The rib contact portion is provided at a front end of the terminal contact portion or the locking portion. The wire side terminal is attached to an inner portion of the cover member from a side of the bottom portion of the wire side terminal.

According to the above configuration, when the wire side terminal is inserted to the cover member, the rib contact portion constitutes a portion pushed by the finger of the operator, thereby, an operation of inserting the wire side terminal is facilitated. The rib contact portion of the wire side terminal not only prevents the wire side terminal from being semilocked to the cover member but contributes to promote an operability when the wire side terminal is inserted to the cover member. According to the invention, since an inserting direction of the wire side terminal with respect to the cover member is changed, when the wire side terminal is inserted to the cover member, the operator can determine a locking state of the wire side terminal and the cover member with the visual judgment.

Also, an advantage of capable of promoting an operability in inserting the wire side terminal to the cover member and an operability related to integration of the cover attached wire is achieved.

Preferably, a first positioning rib is provided on an inner portion of the cover member. A wall inserting groove is formed between the first positioning rib and a first side wall of the cover member. The wire side terminal has a positioning wall which is inserted to the wall inserting groove, and has a rib escaping groove into which the first positioning rib is inserted.

According to the above configuration, rattling of the wire side terminal at the inner portion of the cover member is prevented. Thereby, an advantage of capable of excellently maintaining a state of connecting the wire side terminal and the relay terminal is achieved.

Here, it is preferable that, a second positioning rib for restricting the wire side terminal is provided in a vicinity of a second side wall of the cover member and is provided at a position to which the first positioning rib is opposed.

According to the above configuration, rattling of the wire side terminal at the inner portion of the cover member is further firmly prevented.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Figure 1:
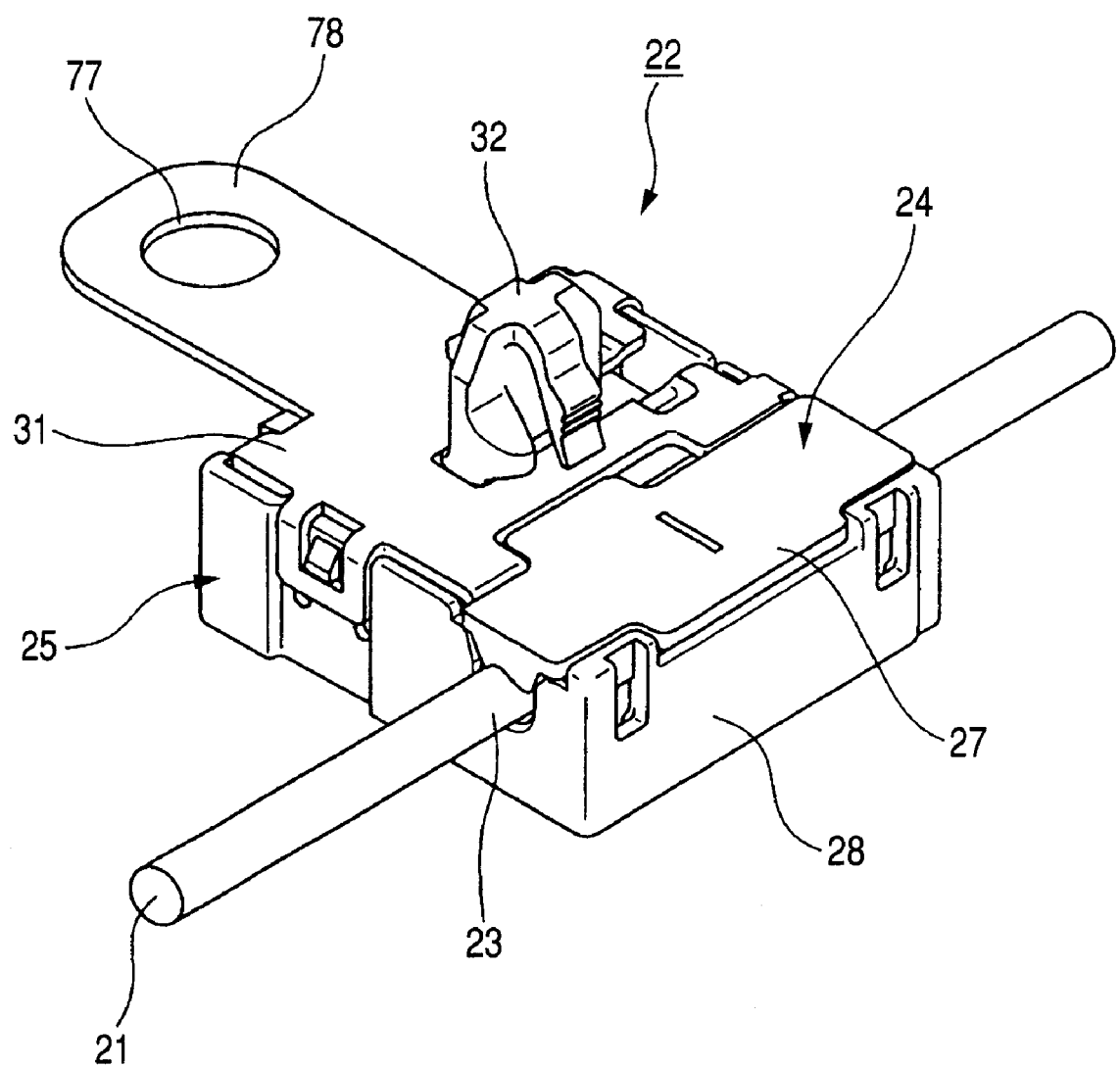
FIG. 1 is a perspective view showing an embodiment of an electronic part equipped unit of the invention.
Figure 3:
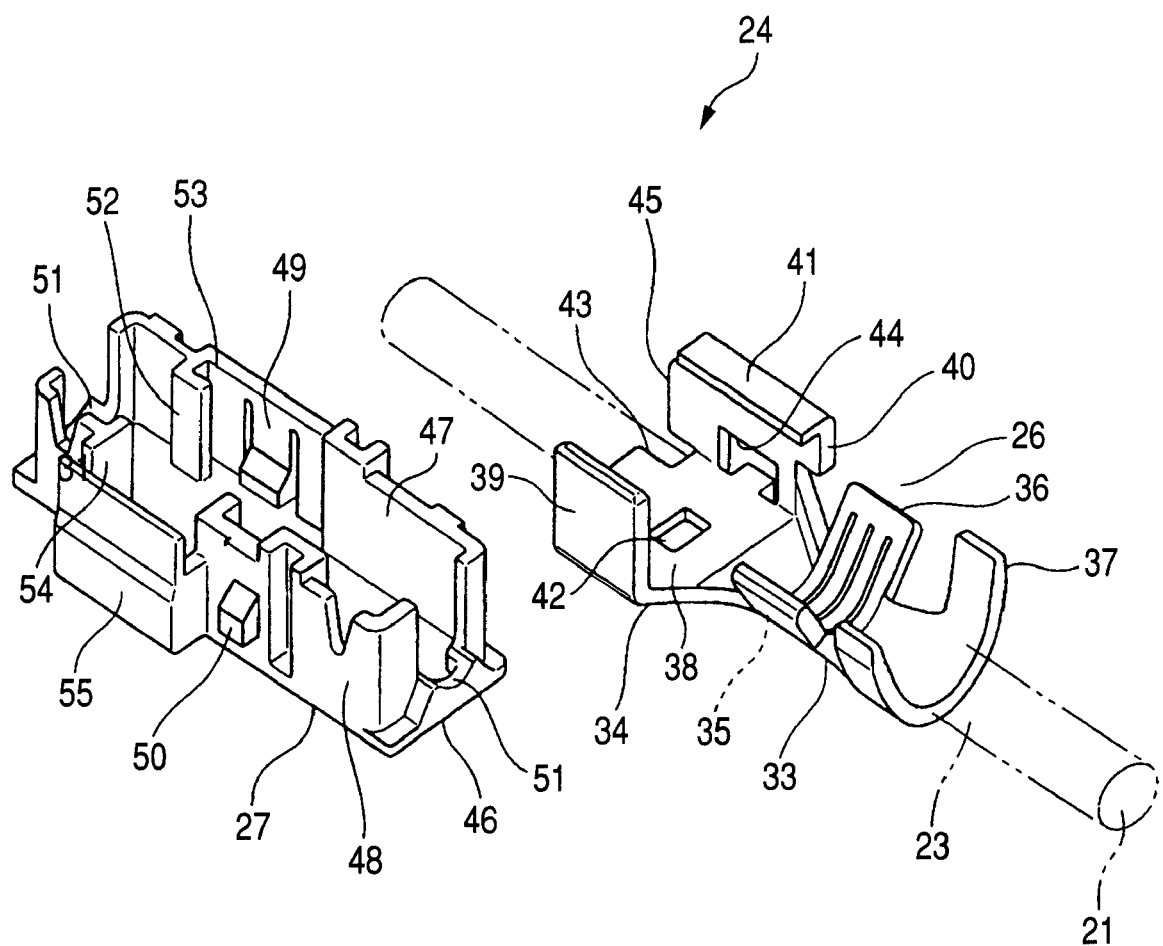
FIG. 3 is a disassembled perspective view of a cover attached wire.
Figure 4:
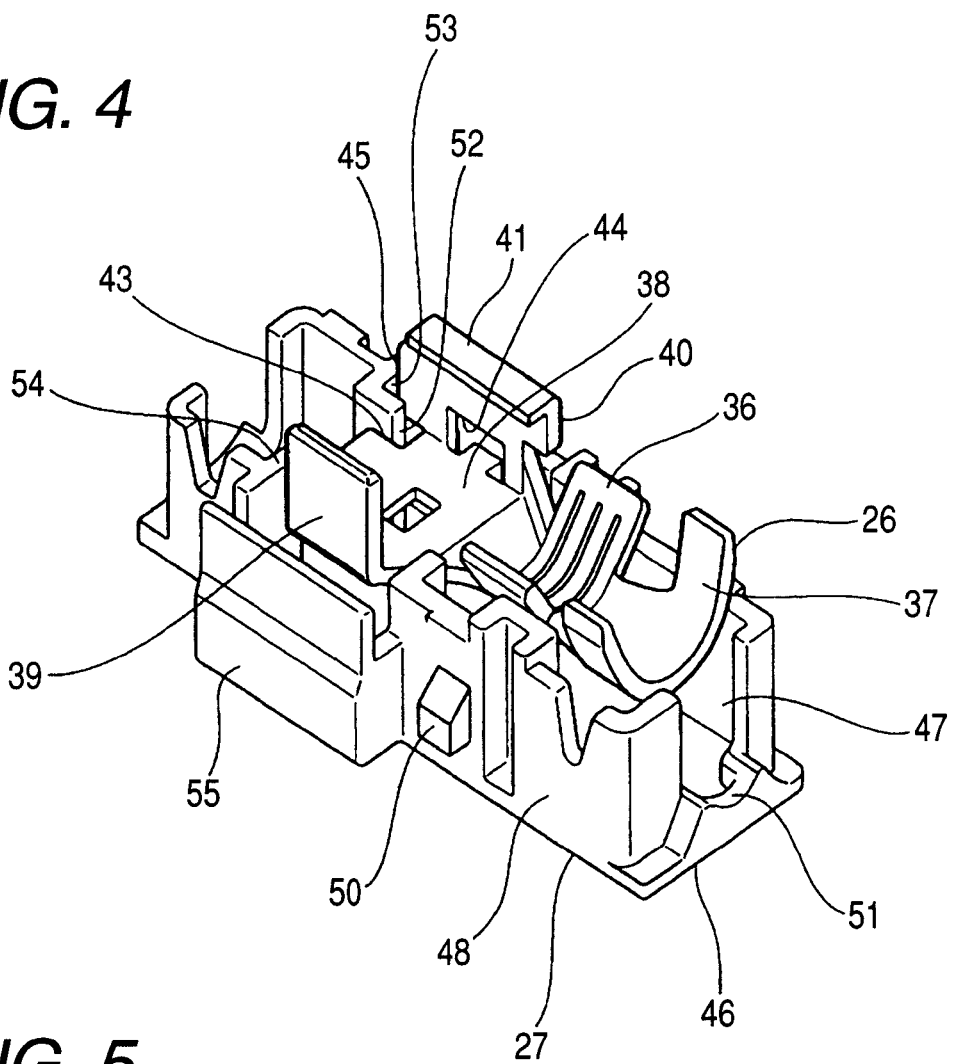
FIG. 4 is a perspective view showing a state immediately before inserting a wire side terminal to a cover member.
Figure 5:
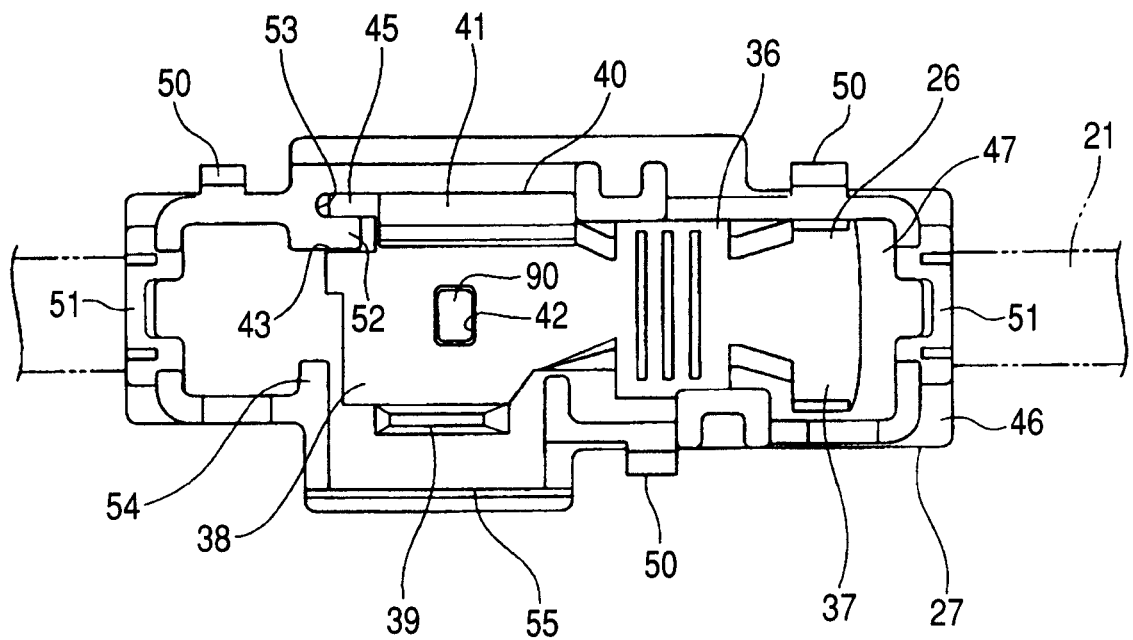
FIG. 5 is a plane view showing a state of inserting the wire side terminal to the cover member.
Figure 6:
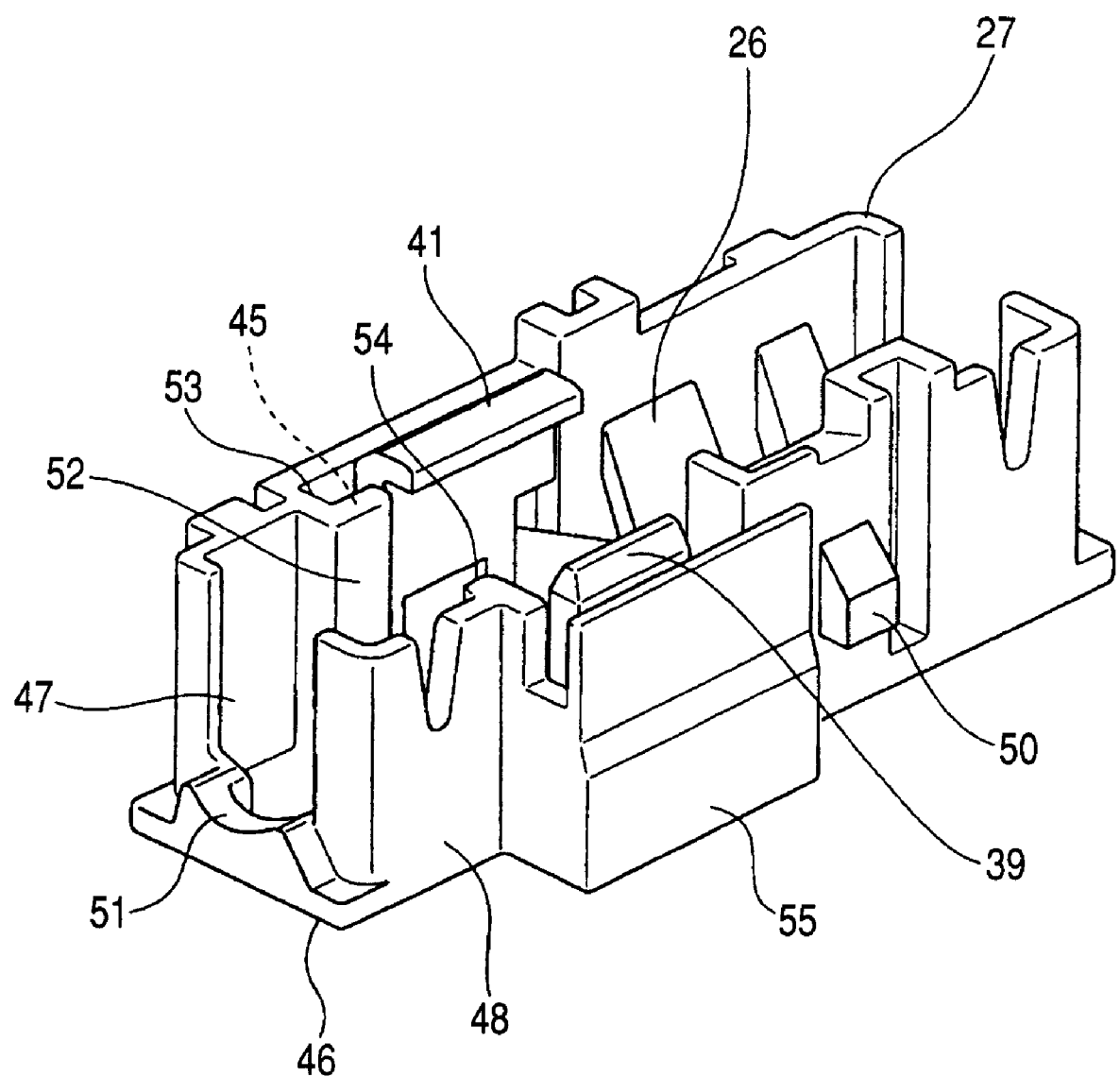
FIG. 6 is a perspective view showing a state of inserting the wire side terminal to the cover member.
Figure 7:
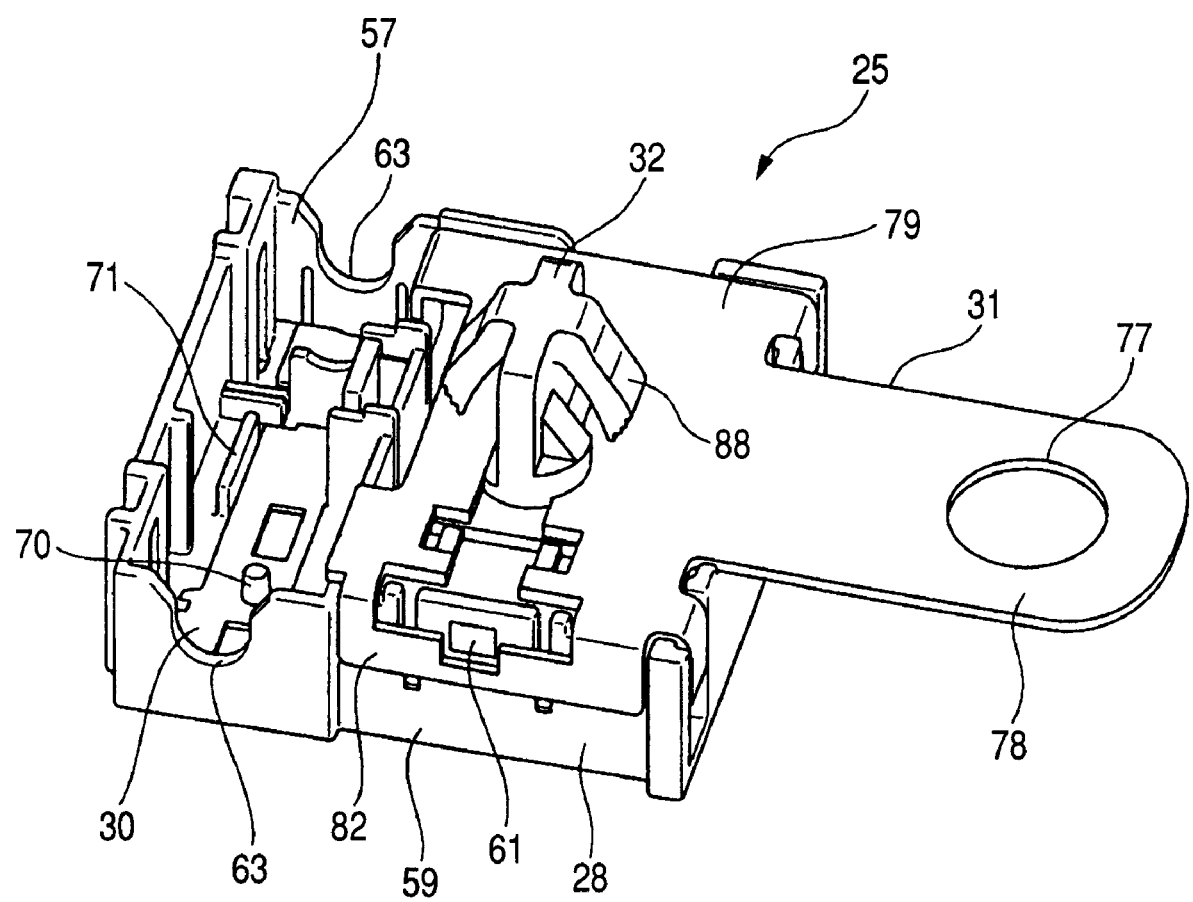
FIG. 7 is a perspective view of a unit main body.
Figure 8:
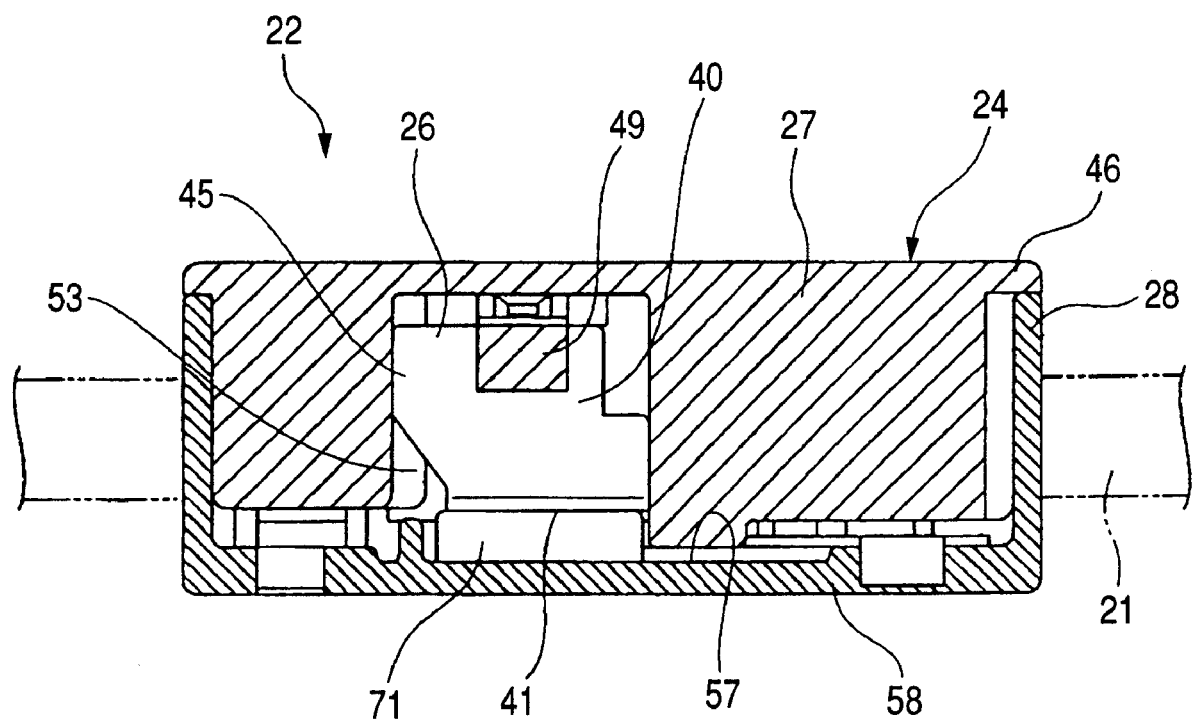
FIG. 8 is a sectional view showing a state of bringing the wire side terminal into contact with a positioning rib.
Figure 9:
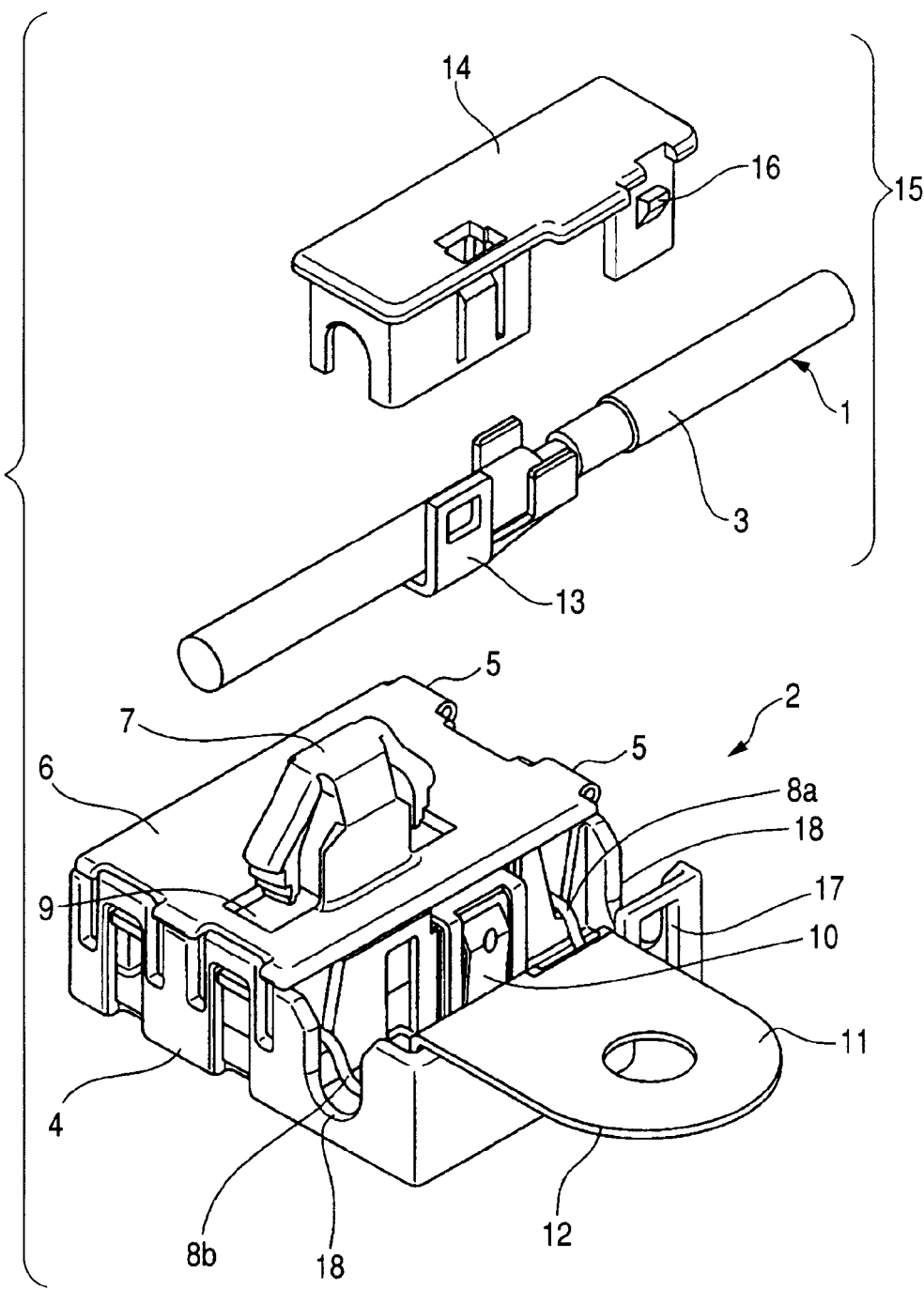
FIG. 9 is a disassembled perspective view of an electronic part equipped unit of a background art.

An explanation will be given in reference to the drawings as follows. FIG. 1 is a perspective view showing a mode of an embodiment of an electronic part equipped unit of the invention. Further, FIG. 2 is a disassembled perspective view showing a constitution of the electronic part equipped unit, FIG. 3 is a disassembled perspective view of a cover attached wire, FIG. 4 is a perspective view showing a state immediately before inserting a wire side terminal to a cover member, FIG. 5 is a plane view showing a state of inserting the wire side terminal to the cover member, FIG. 6 is a perspective view showing a state of inserting the wire side terminal to the cover member, FIG. 7 is a perspective view of a unit main body, and FIG. 8 is a sectional view showing a state of bringing the wire side terminal into contact with a positioning rib.

Figure 2:
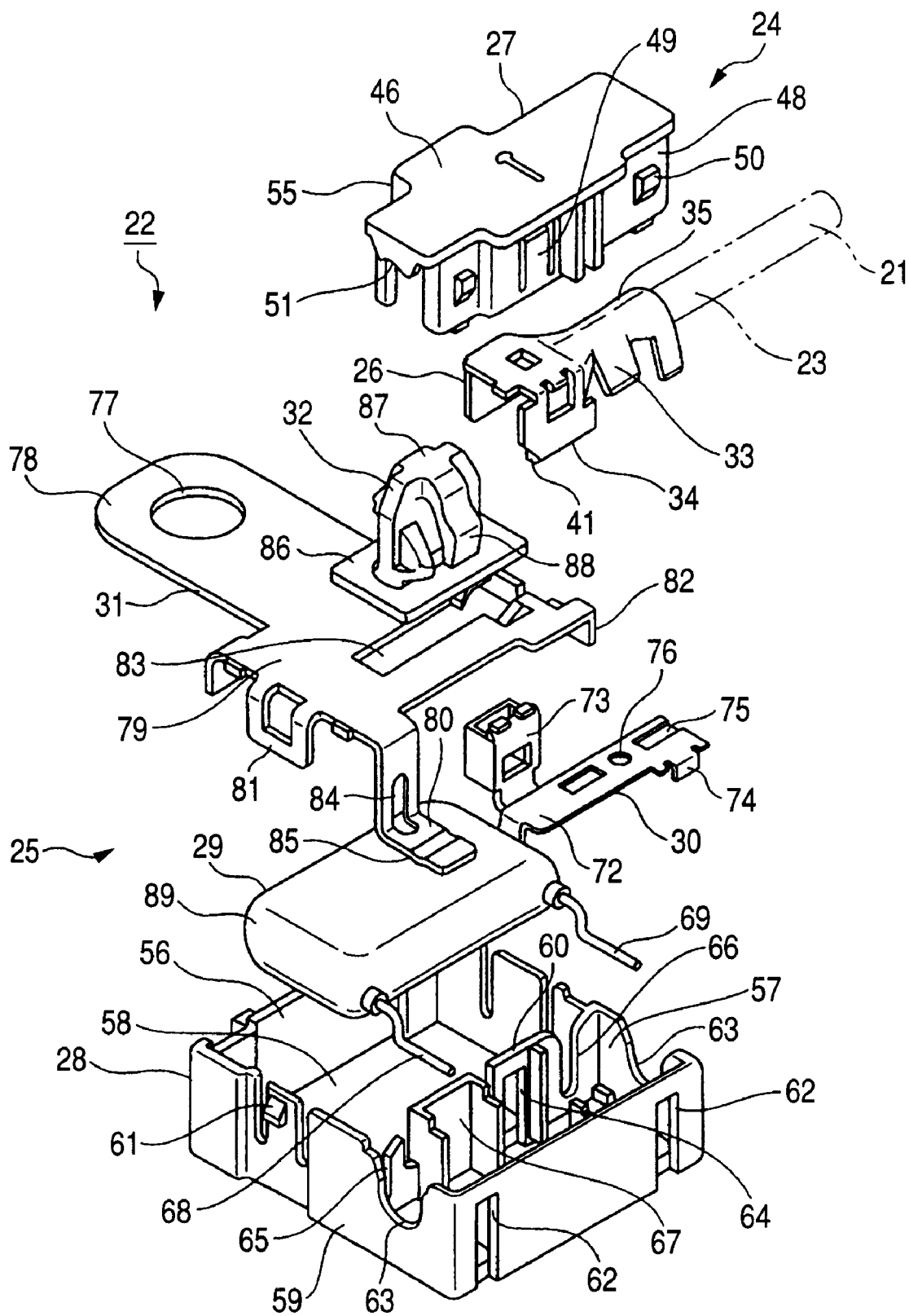
FIG. 2 is a disassembled perspective view showing a constitution of the electronic part equipped unit.

In FIG. 1 and FIG. 2, a reference 21 designates a wire. Further, a reference 22 designates an electronic part equipped unit connected to a middle portion 23 of the wire 21. The electronic part equipped unit 22 includes a cover attached wire 24 which is attached to the middle portion 23 of the wire 21 previously, and a unit main body 25 electrically connected and fitted to the cover attached wire 24.

The cover attached wire 24 includes a wire side terminal 26 and a cover member 27 in addition to the wire 21. Further, the unit main body 25 fitted with the cover attached wire 24 includes a case body 28, an electronic part 29, a relay terminal 30, a ground terminal 31, and a clamp 32. The above-described respective constitutions will be explained in reference to FIG. 1 through FIG. 8 as follows (an explanation will be given of integration after explaining the constitution).

In explaining the embodiment, the wire 21 is arranged to a vehicle or the like although not particularly limited (applicable also to other than a vehicle). Further, the electronic part equipped unit 22 is locked by and fixed to a predetermined seat face of a vehicle body.

In FIG. 1 and FIG. 2, the wire 21 is one piece of a plurality of wires constituting a wire harness or a single wire, and has a conductor and an insulating cover portion covering the conductor. The middle portion 23 of the wire 21 is electrically connected to the wire side terminal 26.

In FIG. 2 through FIG. 6, the wire side terminal 26 includes a metal having a conductivity and includes a wire connecting portion 33 directly connected to the conductor, and an electric contact portion 34 continuous to a front side of the wire connecting portion 33. A reference 35 designates a bottom portion (bottom) of the wire side terminal 26. The wire connecting portion 33 includes a pair of conductor fastening pieces 36 for fastening the conductor exposed by peeling a sheath of the middle portion 23 of the wire 21, and a pair of cover fastening portions 37 for fastening the cover portion.

The electric contact portion 34 includes a base portion 38, a connection tab 39 (terminal connecting portion) consecutively aligned to one side portion of the base portion 38, a looking portion 40 consecutively aligned to other side portion of the base portion 38, and a rib contact portion 41 consecutively aligned to the locking portion 40. The electric contact portion 34 is formed by a folding process. The base portion 38, the connection tab 39 and the locking portion 40 are formed in a U shape by the folding process. The wire 21 is passed through a portion between the connection tab 39 and the locking portion 40.

The rib contact portion 41 is continuous to the locking portion 40 by the folding process. Also, the rib contact portion 41 is formed so as to be parallel to the base portion 38. The rib contact portion has a width so that an operator does not feel a pain at the finger when the rib contact portion is pushed by the finger. Further, the rib contact portion 41 may be continuous to a front end of the terminal contact portion although depending on a function of the connection tab 39 (a terminal contact portion).

The base portion 38 is formed with a through hole 42 for positioning relative to the cover member 27. The through hole is formed at a center of the base portion 38. A front side of the base portion 38 is formed with a rib escaping groove 43. The rib escaping groove 43 is notched to be formed at a vicinity of a continuous portion of the looking portion 40. The rib escaping groove 43 is formed as a portion for preventing rattling.

The locking portion 40 has a locking hole 44 for locking. The locking hole 44 is formed in accordance with a position of the looking portion 40 continuous to the base portion 38. The locking hole 44 is formed so as to prevent the wire side terminal 26 from being detached from the cover member 27. A front side of the looking portion 40 is formed with a positioning wall 45. The positioning wall 45 is formed on a front side of the locking hole 44, and is formed to be continuous to the rib escaping groove 43 of the base portion 38.

The connection tab 39 is constituted by a tab-like shape and is formed as a portion of carrying out an electric connection by being inserted to the relay terminal 30 of the unit main body 25.

The wire side terminal 26 is inserted to inside of the cover member 27 from a side of the bottom portion 35 of the wire side terminal 26 in a state that the wire side terminal 26 is connected to the middle portion 23 of the wire 21. Further, when the wire side terminal 26 is locked by the cover member 27, the wire side terminal 26 is made not to be detached therefrom. The wire side terminal 26 is easily inserted to inside of the cover member 27 by pushing the rib contact portion 41 toward the cover member 27 by the finger of the operator.

In FIG. 2 through FIG. 6, the cover member 27 is made of an insulating synthetic resin and is formed so as to have a shape for locking the wire side terminal 26 and fitting to the case body 28 of the unit main body 25. The cover member 27 includes a ceiling wall 46 and side walls continuous to the ceiling wall 46. With regard to the side wall, an inner side of the side walls are formed to constitute a wire containing portion 47. Further, with regard to the side walls, an outer side thereof (side walls per se) is formed to constitute a case body inserting guide portion 48 functioning as a guide when the cover member 27 is inserted to the case body 28.

Also, the one side wall is formed with a locking projection 49 in an arm-like shape having a flexibility. Further, the side walls are formed with a plurality of cover side fitting portions 50 substantially in a projected shape. The locking projection 49 is formed to lock the wire side terminal 26 inserted to inside of the cover member 27. The cover side looking portion 50 is formed to fit to the case body 28. Further, the side wall is formed with a pair of wire support portions 51 in a U-like shape for supporting the wire 21 in a press fit state (although the wire 21 is preferably supported in the press fit state, the other structure will do so far as the structure can maintain a horizontal state of the wire 21 when the cover member 27 is attached. The structure is preferably contributes to prevent bending, skewed insertion or the like of the wire 21).

A first positioning rib 52, a wall inserting groove 53, and a second positioning rib 54 are formed inside of the cover member 27. The first positioning rib 52 and the wall inserting groove 53 are formed at an inner face of a side wall on a side on which the locking projection 49 is present (the side wall on the side on which the locking projection 49 is present is defined as one side wall).

The first positioning rib 52 and the wall inserting groove 53 are formed at a vicinity of the locking projection 49. The first positioning rib 52 is formed to extend straight from an inner face of the calling wall 46 to an opening portion of the cover member 27. The wall inserting groove 53 is formed between the first positioning rib 52 and one side wall. The first positioning rib 52 is formed as an L-like shape in order to form the wall inserting groove 53 (when the opening portion of the cover member 27 is viewed in the plane view, the first positioning rib 52 is viewed in the L-like shape).

The first positioning rib 52 and the wall inserting groove 53 are formed as portions of preventing the rattling of the wire side terminal 26. The first positioning rib 52 is inserted to the rib escaping groove 43 of the wire side terminal 26 when the wire side terminal 26 is inserted to inside of the cover member 27. Further, the positioning wall 45 of the wire side terminal 26 is inserted to the wall inserting groove 53. When a force causing the rattling is applied, a meshing is made in this configuration.

The second positioning rib 54 is formed on the inner face of the other side wall being opposed to the one side wall. The other side wall is formed with a protruding portion 55 in correspondence with the connection tab 39 of the wire side terminal 26. The second positioning rib 54 is formed at a vicinity of the protruding portion 55. Further, the second positioning rib 54 is formed at a position of being opposed to the first positioning rib 52. The second positioning rib 54 is formed to extend straight from the inner face of the ceiling wall 46 to the opening portion of the cover member 27.

The second positioning rib 54 is formed as a portion of preventing rattling of the wire side terminal 26. The second positioning rib 54 is formed such that when the wire side terminal 26 is inserted to inside of the cover member 27, a front and of the wire side terminal 26 is brought into contact therewith.

In FIG. 1 and FIG. 2, the case body 28 of the unit main body 25 is made of an insulating synthetic resin and includes an electronic part containing recess portion 56 and a fitting connection recess portion 57 contiguous to the electronic part containing recess portion 56. The electronic part containing recess portion 56 and the fitting connection recess portion 57 are formed by being surrounded by a bottom wall 58, a side wall 59 formed at an edge portion of the bottom wall 58, and a partition wall 60. The electronic part containing recess portion 56 is formed as a portion in a recess shape for containing the electronic part 29. The fitting connection recess portion 57 is formed as a portion in a recess shape fitted with the cover attached wire 24 to carry out electric connection. The electronic part containing recess portion 56 and the fitting connection recess portion 57 are partitioned by the partition wall 60.

The side wall 59 is formed with a locking projection 61 and a projection locking portion 62. Further, the side wall 59 is formed with a pair of wire support portions 63. The projection locking portion 62 is formed as a portion of fitting the cover attached wire 24. The pair of wire support portions 63 are formed to be notched in a U-like shape at portions of the fitting connection recess portions 57. The pair of wire support portions 63 are inserted with the wire 21 in fitting the cover attached wire 24 and formed to be able to support the wire 21.

Further, although a structure of the projection locking portion 62 of FIG. 2 differs from that of FIG. 1, either of the structures may be adopted.

The partition wall 60 is formed with a projection locking portion 64, lead support portions 65 and 66 and a protruding portion 67. The projection locking portion 64 is formed as a portion for fitting the cover attached wire 24. The lead support portions 65 and 66 are formed for supporting leads 68 and 69 of the electronic part 29 contained at the electronic part containing recess portion 56 extended to the fitting connection recess portion 57. The lead support portions 65 and 66 are formed in a slit-like shape.

In FIG. 7, a fixing portion 70 for positioning and fixing the relay terminal 30 are formed on a bottom wall 58 (a bottom portion) of the fitting connection recess portion 57. The fixing portion 70 is formed in a pin-like shape. Further, a positioning rib 71 extended along a longitudinal direction of the relay terminal 30 is formed on the bottom portion of the fitting connection recess portion 57. The positioning rib 71 is formed to position the relay terminal 30 and to prevent semilocking of the wire side terminal 26. The positioning rib 71 is formed not simply as a projected streak but as the portion having the above-described two functions.

Here, an operation of the positioning rib 71 will be explained. When the wire side terminal 26 is not completely attached to the cover member 27 (a semilocking state) in fitting the cover attached wire 24 to the fitting connection recess portion 57, the rib contact portion 41 of the wire side terminal 26 is brought into contact with the positioning rib 71. The rib contact portion 41 is brought into contact with the positioning and semilocking preventing rib 71 before finishing to fit with the cover attached wire 24. Further, when fitting of the cover attached wire 24 is continued, the wire side terminal 26 is pushed to inside of the cover member 27 by the positioning rib 71 to be brought into a locking state (refer to FIG. 8 for locking state). Therefore, the fitting in the semilocking state is prevented and a drawback is restrained from being brought about.

In FIG. 2, the relay terminal 30 includes a fixed board portion 72 in a shape of a bus bar comprising a metal having a conductivity and a tab connecting portion 73 consecutively aligned at one side portion of the fixed board portion 72 and inserted with the connection tab 39 of the wire side terminal 26. The fixed board portion 72 is formed to be mounted to and fixed by the bottom (bottom wall 58) of the fitting connection recess portion 57.

The fixed board portion 72 is formed with a plurality of fixing boards 74 caught by the bottom of the fitting connection recess portion 57 for preventing detachment of the relay terminal 30. Further, the fixed board portion 72 is formed with a welding portion 75 brought into contact with the lead 69 of the electronic part 29 and welded thereto in integration. A reference 76 designates a through hole inserted to the fixing portion 70 of the fitting connection recess portion 57 for positioning.

The tab connecting portion 73 is formed in a box-like shape. Inside of the tab connecting portion 73 is formed with an elastic contact piece (not illustrated) elastically brought into contact with the connection tab 39 of the wire side terminal 26.

The relay terminal 30 is inserted to the fixing portion 70 to be positioned to be fixed, further, positioned also by the positioning rib 71, further, the fixing claw 74 of its own is caught by the bottom of the fitting connection recess portion 57, and therefore, the relay terminal 30 is attached to the fitting connection recess portion 57 without rattling.

In FIG. 1, FIG. 2 and FIG. 7, the ground terminal 31 includes a ground portion 78 comprising a metal having a conductivity and having a through hole 77 for screw fastening, a base portion 79 formed by a shape as a cover for covering an opening portion of the electronic part containing recess portion 56, and a connection leg portion 80 continuous to the base portion 79.

The base portion 79 is provided with the function of the cover as described above and formed with fitting portions 81 and 82 to be caught by the locking protection 61 of the case body 28. Further, the base portion 79 is formed with a clamp attachment and detachment portion 83 for attaching the clamp 32 inserted to and looked by the seat face of the vehicle body. The base portion 79 is formed by a shape of capable of pushing the electronic part 29 after having been contained in the electronic part containing recess portion 56.

The fitting portions 81 and 82 are constituted substantially by a frame-like shape to hang down respectively from side portions of the base portion 79. The fitting portions 81 and 82 are provided with a necessary sufficient flexibility for riding over the locking projections 61 of the case body 28. The clamp attachment and detachment portion 83 is formed in a slit-like shape of notching the base portion 79. The clamp attachment and detachment portion 83 is formed to be able to slide to fix the clamp 32 after inserting the clamp 32. A portion of the clamp attachment and detachment portion 83 for inserting the clamp 32 is consecutively aligned with the fitting portion 82.

The connecting leg portion 80 is a portion inserted to the fitting connection recess portion 57 and is formed such that a strip piece is folded to bend in an L-like shape. The portion of folding to bend the connecting leg portion 80 is formed with a slit 84 to escape the lead 68 of the electronic part 29. Further, a portion thereof in correspondence with the bottom of the fitting connection recess portion 57 is formed with a welding portion 85 in a projected shape brought into contact with and welded to the lead 68.

In FIG. 1, FIG. 2 and FIG. 7, the clamp 32 is a member made of a synthetic resin, constituted by a structure of being attachable and detachable to and from the ground terminal 31 and a structure inserted to the seat face of the vehicle body to be looked by the portion. The clamp 32 is provided with a function as a locking portion. The clamp 32 includes a base plate 86 in parallel with the base portion 79 of the ground terminal 31, a stay 87 provided at a surface of the base plate 86 and a pair of locking blades 88 having a flexibility and consecutively aligned to the stay 87. The clamp 32 is made to be able to make respective end portions of the locking blades 88 caught by an opening edge of a clamp hole by inserting the pair of locking blades 88 to the clamp hole formed at the seating face of the vehicle body.

In FIG. 2, the electronic part 29 includes a main body 89 and a pair of the leads 68 and 69. Although according to the embodiment, a known capacitor is used for the electronic part 29 for a noise filter, a diode or a resistor may be used in accordance with other use.

Next, an explanation will be given of integration of the cover attached wire 24, integration of the unit main body 25, integration of the electronic part equipped unit 22, and attachment of the electronic part equipped unit 22 based on the above-described constitution.

With regard to the cover attached wire 24, first, at the middle portion 23 of the wire 21 constituting a desired position, an operation of removing the cover portion of the wire 21 in a predetermined range to expose the conductor and connecting the wire side terminal 26 to the exposed conductor is carried out. Next, an operation of inserting the wire side terminal 26 to inside of the cover member 27 from the side of the bottom portion 35 to lock the wire side terminal 26 is carried out. When the wire side terminal 26 is locked by the cover member 27, the integration with regard to the cover attached wire 24 is finished.

The insertion of the wire side terminal 26 is carried out while pushing the rib contact portion 41 by the finger of the operator, and therefore, the inserting and locking operation can easily by carried out. Further, the state of locking the wire side terminal 26 and the cover member 27 is made to be able to be optically observed from the opening portion of the cover member 27.

When the integration of the cover attached wire 24 has been finished, the wire side terminal 26 is fixed without rattle at inside of the cover member 27. That is, the wire side terminal 26 is inserted to inside of the cover member 27, the rib escaping groove 43 of the wire side terminal 26 is inserted with the first positioning rib 52 of the cover member 27, further, the positioning wall 46 of the wire side terminal 26 is inserted to the wall inserting groove 53 of the cover member 27, further, the front end of the wire side terminal 26 is brought into a state of being able to be brought into contact with the second positioning rib 64 of the cover member 27, thereby, the wire side terminal 26 is fixed without rattling at inside of the cover member 27 (rattling in a rolling direction and rattling in a twist direction are particularly excellently prevented). With regard to positioning the wire side terminal 26, also the through hole 42 of the wire side terminal 26 and the positioning projection 90 (refer to FIG. 5) of the cover member 27 are effectively functioned.

The wire side terminal 26 is contained in the wire containing portion 47 of the cover member 27 and is protected by the cover member 27. The wire 21 is supported by the wire support portion 51 of the cover member 27. The integration of the cover attached wire 24 is finished in the form of maintaining the horizontal state of the wire 21.

With regard to the unit main body 25, first, an operation of containing the main body 89 of the electronic part 29 to the electronic part containing recess portion 56 of the case body 28 and mounting the respective front end sides of the leads 68 and 69 to the bottom of the fitting connection recess portion 57 to position while inserting middle portions of the leads 68 and 69 of the electronic part 29 to the lead support portions 65 and 66 is carried out. Next, the relay terminal 30 and the connecting leg portion 80 of the ground terminal 31 are respectively attached to predetermined positions of the fitting connection recess portion 57. At this occasion, the base portion 79 of the ground terminal 31 is fitted to the case body 28 while covering the electronic part containing recess portion 56 containing the main body 89 of the electronic part 29. Successively, an operation of respectively welding the relay terminal 30 and the connecting leg portion 80 and fixing the respective welding portions 85 and 75 in the projected shape and the leads 68 and 69 is carried out. Thereby, the integrating operation with regard to the unit main body 25 is finished.

After finishing to integrate the cover attached wire 24 and integrate the unit main body 25, an operation of fitting the cover attached wire 24 to the fitting connection recess portion 57 of the unit main body 25 and forming an electric connection state simultaneously therewith is carried out. Thereby, an operation of integrating the electronic part equipped unit 22 is finished.

With regard to attachment of the electronic part equipped unit 22, first, an operation of provisionally fixing the electronic part equipped unit 22 by inserting the clamp 32 to the clamp hole formed at the seating face of the vehicle body is carried out. Next, an operation of positioning the through hole 77 for screw fastening of the ground terminal 31 to the screw hole formed at the seating face and fixing the ground portion 78 of the ground terminal 31 to the seating face by fastening by the screw is carried out. Further, at this occasion, a rotational torque produced in screw fastening is received by the clamp 32 directly fixed to the ground terminal 31. When the ground portion 78 of the ground terminal 31 has been finished to fix, an operation of attaching the electronic part equipped unit 22 is finished.

As described above, as explained in reference to FIG. 1 through FIG. 8, according to the invention, a direction of the wire side terminal 26 in inserting to the cover member 27 is changed in a direction revere to that of the related art, and therefore, when the wire side terminal 26 is inserted to the cover member 27, the looking state can be confirmed by visual detection. Further, according to the invention, the positioning rib 71 is formed at the fitting connection recess portion 57, and therefore, rattling of the relay terminal 30 can be prevented, when the wire side terminal 26 is brought into the semilocking state relative to the cover member 27, the wire side terminal 26 can be brought into the locking state by pushing the wire side terminal 26 to inside of the cover member 27 by the positioning rib 71. Therefore, the wire side terminal 26 can be prevented from being semilocked. Further, according to the invention, the first positioning rib 52, the wall inserting groove 53, the rib escaping groove 43, the positioning wall 45, and the second positioning rib 54 are provided, and therefore, rattling of the wire side terminal 26 at inside of the cover member 27 can be prevented. Thereby, the state of connecting the wire side terminal 26 and the relay terminal 30 can excellently be maintained.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2007-176841 flied on Jul. 5, 2007, the contents of which are incorporated herein for reference.

What is claimed is:

1. An electronic part equipped unit, comprising:
   a case body that includes a first recess portion for containing an electronic part and a second recess portion for containing a relay terminal which is connected to the electronic part;
   a wire side terminal to which a middle portion of a wire is attached; and
   a cover member to which the wire side terminal is attached,
   wherein the wire side terminal is brought into contact with the relay terminal when the cover member to which the wire side terminal is attached is fitted to the second recess portion of the case body;
   wherein a positioning rib for restricting the relay terminal is provided on a bottom portion of the second recess portion of the cover body;
   wherein the wire side terminal has a rib contact portion; and
   wherein a projection amount of the positioning rib is set so that the rib contact portion is brought into contact with the positioning rib when the cover member is fitted to the second recess portion of the case body in a state that the wire side terminal is not completely attached to the cover member.

2. The electronic part equipped unit according to claim 1, wherein the wire side terminal includes:

a bottom portion; and a terminal contact portion for contacting to the relay terminal and a locking portion for retaining to the cover member, the terminal contact portion and the looking portion being provided on the bottom portion;

wherein the rib contact portion is provided at a front end of the terminal contact portion or the locking portion; and wherein the wire side terminal is attached to an inner portion of the cover member from a side of the bottom portion of the wire side terminal.

3. The electronic part equipped unit according to claim 1, wherein a first positioning rib is provided on an inner portion of the cover member;

wherein a wall inserting groove is formed between the first positioning rib and a first side wall of the cover member; and wherein the wire side terminal has a positioning wall which is inserted to the wall inserting groove, and has a rib escaping groove into which the first positioning rib is inserted.

4. The electronic part equipped unit according to claim 3, wherein a second positioning rib for restricting the wire side terminal is provided in a vicinity of a second side wall of the cover member and is provided at a position to which the first positioning rib is opposed.

* * * * *